US012687148B1

(12) United States Patent
Hardin et al.

(10) Patent No.: US 12,687,148 B1
(45) Date of Patent: Jul. 21, 2026

(54) ROTATING LIQUID FILLED WHEEL SYSTEM

(71) Applicants: Wise Jackson Hardin, Altamonte Springs, FL (US); John Paul Hardin, Fairview, NC (US)

(72) Inventors: Wise Jackson Hardin, Altamonte Springs, FL (US); John Paul Hardin, Fairview, NC (US)

( * ) Notice: Subject to any disclaimer, the term of this patent is extended or adjusted under 35 U.S.C. 154(b) by 0 days.

(21) Appl. No.: 19/383,055

(22) Filed: Nov. 7, 2025

(51) Int. Cl.
*F03B 17/04* (2006.01)

(52) U.S. Cl.
CPC .................................... *F03B 17/04* (2013.01)

(58) Field of Classification Search
CPC ....................................................... F03B 17/04
See application file for complete search history.

(56) References Cited

U.S. PATENT DOCUMENTS 12,071,891 B1 * 8/2024 Coots ....................... H02K 7/18
2018/0058179 A1 3/2018 Nuryaningsih et al.

FOREIGN PATENT DOCUMENTS

CN 118188287 A * 6/2024 ............. F03B 17/02
KR 20140093046 A 7/2014

* cited by examiner

*Primary Examiner* — Joseph Ortega
(74) *Attorney, Agent, or Firm* — Jason T. Daniel, Esq.; Daniel Law Offices, P.A

(57) ABSTRACT

A rotating liquid filled wheel system includes a base platform that is connected to the rotational plate assembly of a wheel having an internally located weighted flotation device. The base platform positions the wheel in an upright orientation. The wheel includes a central tube that is connected to the rotational assembly and a plurality of radial tubes that form a polygon shape. The wheel includes a continuous watertight internal pathway that is filled with a liquid. The weighted flotation device includes a central weight and a plurality of floats extending outward from two sides. The plurality of floats are more buoyant than the weight and cause the weight to float within the wheel when positioned in a non-horizontal orientation. As the wheel rotates the weight is positioned at an offset orientation that imparts a downward force onto a portion of the wheel to assist the rotation of the wheel.

15 Claims, 6 Drawing Sheets

ROTATING LIQUID FILLED WHEEL SYSTEM

TECHNICAL FIELD

The present invention relates to a rotating liquid filled wheel whose movement can be assisted by an internally positioned weighted flotation device.

BACKGROUND

The statements in this section merely provide background information related to the present disclosure and may not constitute prior art.

The ability to rotate large objects with a minimum amount of added force remains a useful goal that has applications across a wide array of industries. Accordingly, it would be beneficial to provide a rotating liquid filled wheel that can be rotated by an internally positioned weighted device.

SUMMARY OF THE INVENTION

The present invention is directed to a rotating liquid filled wheel system. One embodiment of the present invention can include a base platform that is connected to the rotational plate assembly of a wheel having an internally located weighted flotation device. The base platform can function to support the weight of the wheel and to position the wheel in an upright orientation so as to allow the wheel to spin about the rotational assembly.

In one embodiment, the wheel can include a central tube that is connected to the rotational assembly and a plurality of radial tubes that form a polygon shape. The wheel can be constructed to include a continuous and watertight internal pathway between each of the wheel tubes. The wheel can be filled with a liquid such as water.

The weighted flotation device can include a central weight having a first plurality of floats and a second plurality of floats extending outward in two directions to form an elongated device. Each of the first and second plurality of floats can include a buoyant factor that is between 1 and 2 times that of the weight in order to cause the weight to float within the wheel when positioned in a non-horizontal orientation.

In one embodiment, the weighted flotation device is slidingly positioned within the wheel so as to selectively position the central weight at an offset orientation to the central axis of the wheel in order to cause the weight to impart a downward force onto a portion of the central tube to assist the rotation of the wheel.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
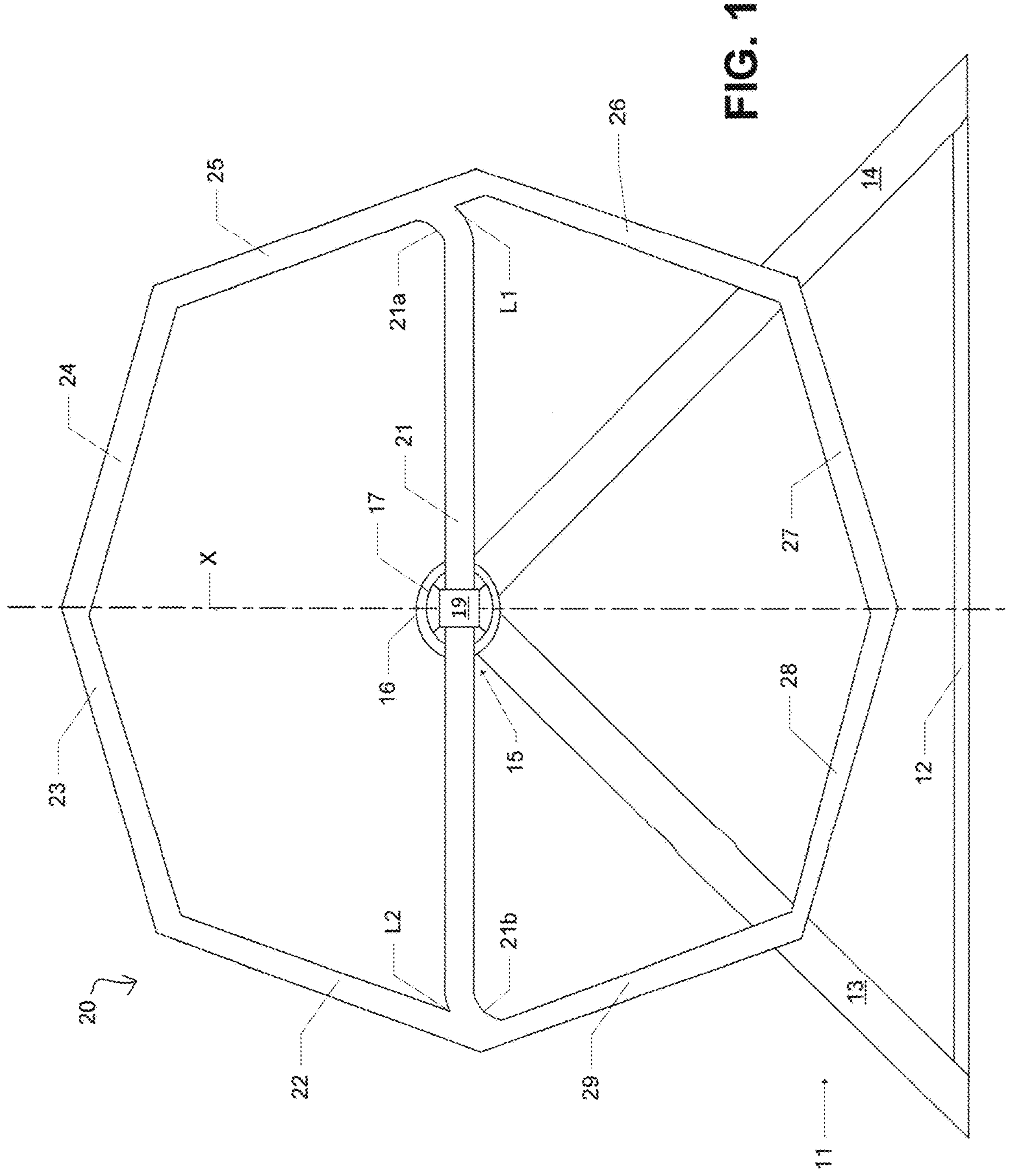
FIG. 1 is a front perspective view of a rotating liquid filled wheel system in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances, or the like.

As described herein, the term "rotatably secured" and derivatives thereof shall be used interchangeably to describe a situation wherein two or more identified objects are joined together in a manner that allows one or both of the objects to rotate, spin, and/or move about or in relation to the other object in one or more of a horizontal, diagonal or vertical manner. Several nonlimiting examples of connectors for rotatably connecting objects together include bearing and shaft assemblies, rotating axle assemblies, and the like, for example.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-6 illustrate one embodiment of a rotating liquid filled wheel system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, the system 10 can include, essentially, a base platform 11, that connects to the rotational plate assembly 15 of a wheel 20 having an internally located weighted flotation device 30.

Figure 2:
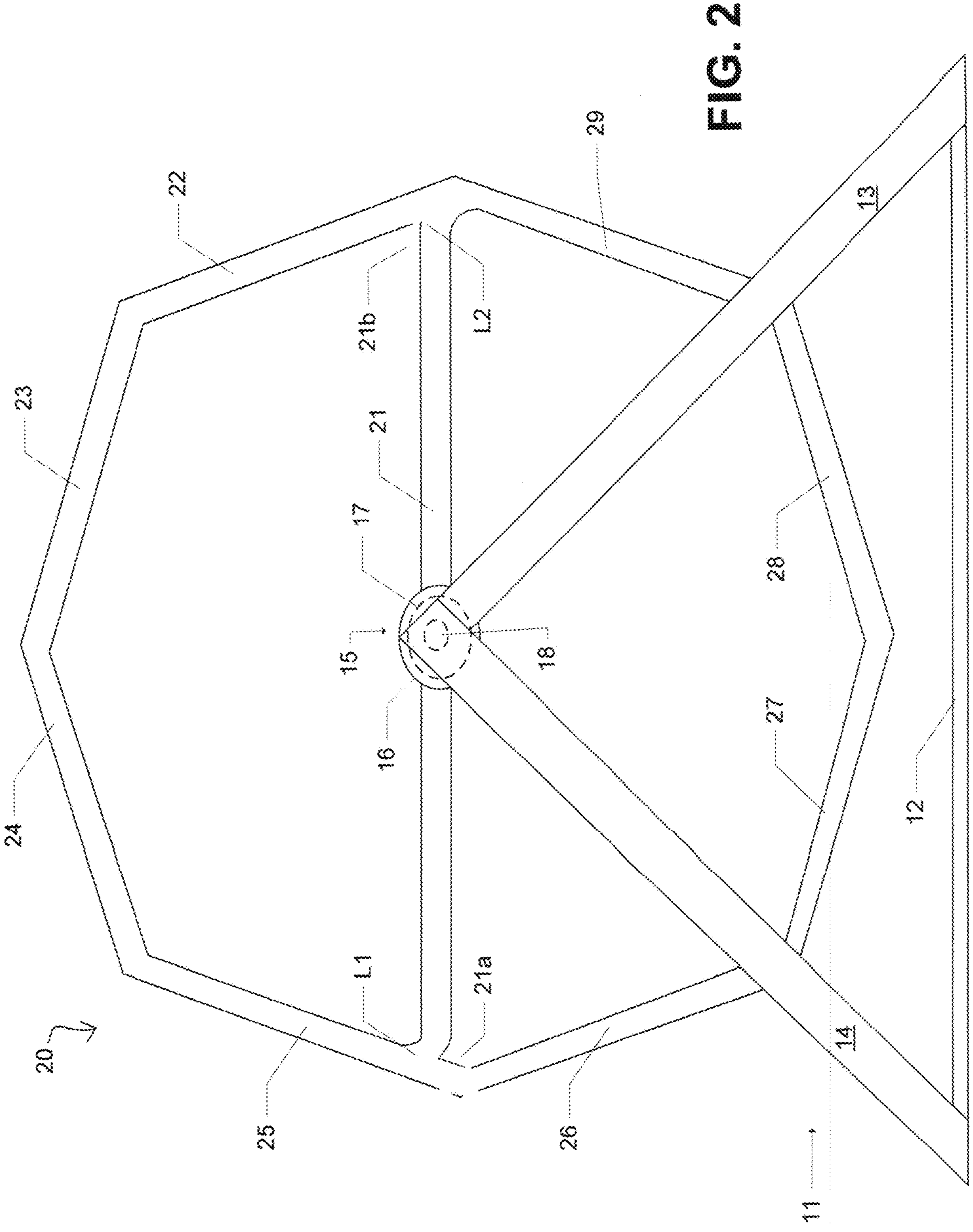
FIG. 2 is a back perspective view of a rotating liquid filled wheel system in accordance with one embodiment of the invention.

As shown best at FIGS. 1 and 2, one embodiment of the base platform 11 can include a ground attachment beam 12 that is connected to a pair of diagonal support beams 13 and 14 along each end. As described herein, the base platform components can be constructed from any number of strong rugged materials such as steel or aluminum, for example, that are suitable for prolonged exposure to adverse weather conditions, of course, any number of other construction materials are also contemplated.

Although described above with regard to a particular arrangement of components, this is for illustrative purposes only. To this end, the base platform 11 can include, comprise or consist of any number of different components and/or arrangement of components that are suitable for supporting the weight of the wheel 20 and for positioning the same in a manner that permits rotation of the wheel as described below.

The rotational plate assembly 15 can connect the wheel 20 to the base platform 11 in a manner that permits the wheel to spin/rotate in place. In one embodiment, the assembly 15 can include a fixed attachment plate 16 that is connected to the distal ends of the diagonal beams 13 and 14 along a back surface via welds or connectors such as bolts, for example. In one embodiment, a rotational plate 17 can be connected to the front surface of the fixed attachment plate 16 via a bearing assembly 18 that rotates to cause the front plate 17 to spin relative to the rear plate 16.

In one embodiment, a wheel connection bracket 19 such as the illustrated clamp bracket, for example, can be provided. The bracket can include any number of fasteners for selectively tightening the bracket halves about the exterior of the central tube 21 at the center of the tube to permit the entire wheel 20 to spin in place. Of course, any number of other types of brackets, clamps and/or connectors may be utilized instead of or in conjunction with the above-described bracket 19 so as to engage the outside portion(s) of the central tube to permit the wheel to rotate and without causing any portion of the bracket to penetrate into the inside chamber of the wheel.

Although the rotational plate assembly is described above with regard to a specific set of components for connecting the wheel 20 to the base platform 11 in a manner that permits the wheel to spin, this is for illustrative purposes only. To this end, those of skill in the art will recognize that the assembly many other components and arrangements of components such as a swivel base plate with axle, among other such components that can function to rotatably connect the wheel to the base platform without undue experimentation.

The wheel 20 can be constructed from a plurality of elongated hollow tubes which are joined along respective ends to form a continuous and uninterrupted pathway though which a liquid such as water and the below described weighted flotation device 30 can be positioned. In one embodiment, the wheel 20 can include a central tube 21, and a plurality of radial tubes 22, 23, 24, 25, 26, 27, 28 and 29 that are joined together along each end to form a generally polygon shape. Although not specifically illustrated, any number of removable plugs can be provided along one or more of the wheel sections to permit the filling and removal of water within the entirety of the watertight internal pathway of the wheel.

In one nonlimiting example, the central tube 21 can include a length of about 40 feet and each of the radial tubes 22-29 can include a length of about 16.6 feet. In such an embodiment, each of the tubes 21-29 will ideally be constructed from rigid plastic or metal, for example, and can include an inside diameter of 4 inches. Of course, other embodiments are contemplated wherein the tubes 21-29 include different lengths and inside diameters, and/or wherein other construction materials that are suitable for withstanding the weight and forces of the device in operation, while retaining a completely watertight internal pathway are utilized.

In one embodiment, the distal ends 21*a* and 21*b* of the central tube 21 can be bent in equal and opposite directions so as to engage the radial tubes and maintain a continuous and uninterrupted internal pathway. For example, distal end 21*a* can include a bend of between about 100 and 115 degrees in a first direction to connect to tube 25, and distal end 21*b* can include an identical bend of between about 100 and 115 degrees in a second, opposite direction, to connect with tube 29.

As will be shown below, portions of the weighted flotation device will enter and exit the central tube during the rotation of the wheel. As such, it is critical that the bends in the central tube be obtuse in nature (as opposed to perpendicular) to create lips L1 and L2 along both ends of the central tube to guide the weighted flotation device from the central tube into the identified radial tube in the specified direction, thus ensuring smooth movement of the weighted flotation device 30 within the wheel 20.

Although described above with regard to a polygon-shaped wheel that is constructed from individual tubular sections, this is but one possible implementation of the wheel. To this end, other embodiments are contemplated wherein the wheel includes other shapes such as octagonal, nonagon, decagon, dodecagon or circular, among others, each having a central tubular member and a continuous internal pathway.

Figure 3:
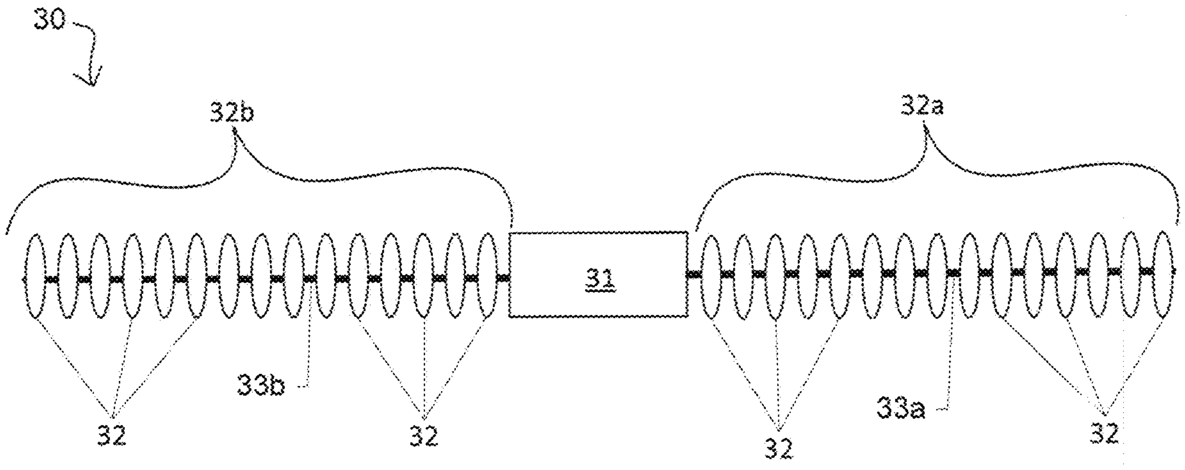
FIG. 3 is a front view of a weighted flotation device of the rotating liquid filled wheel system, in accordance with one embodiment of the invention.

FIG. 3 illustrates one embodiment of a weighted flotation device 30 for positioning within the wheel 20. As shown, the device can include a central weight 31 having a first plurality of floats 32*a* supported by a first spacer 33*a* along one side, and a second plurality of floats 32*b* supported by a second spacer 33*b* along the other side.

As described herein, the central weight 31 can be constructed from any number of objects such as iron, steel, or stone, for example, having a density that is greater than the density of water. In this regard, when the device 30 is positioned within water, the weight 31 will sink and/or will otherwise attempt to travel in a downward direction (e.g., toward the ground attachment beam 12).

As described herein, the first and second plurality of floats 32*a* and 32*b* can each include, comprise or consist of any number of individual objects that are buoyant when immersed within water so as to float and will thus attempt to travel upward (e.g., in a direction opposite to the ground attachment beam).

In one embodiment, each of the individual floats 32 of the plurality of floats 32*a* and 32*b* can comprise an internal pipe float device as described in copending U.S. patent application Ser. No. 19/249,367, to Hardin, the contents of which are incorporated herein by reference.

In either instance, the weighted flotation device 30 is specifically designed such that the first plurality of floats 32*a* and the second plurality of floats 32*b* will be able to independently lift/move the central weight 31 when the device is positioned in a non-horizontal position. More specifically, the first plurality of floats 32*a* and the second plurality of floats 32*b* will each include a buoyant force that is ideally 1-2 times the weight of the weight 31 in order to move/lift the weight 31 through the water. This lifting force causes the entire weighted flotation device 30 to move in the upward direction (e.g., opposite to the ground attachment beam) when traveling within the wheel 20 as the wheel spins about the central rotation plate 15.

The first and second spacers 33*a* and 33*b* function to engage and position each individual float of the first and second plurality of floats equidistantly from each other and the central weight. In the preferred embodiment, the floats will be positioned so as to result in the overall length of the device 30 being exactly twice the length (e.g. distance between ends 21*a* and 21*b*) of the central tube 21 of the wheel 20.

In one embodiment, the first and second spacers 33*a* and 33*b* can each include a semi-flexible rod onto which the plurality of floats 32*a* and 32*b* are connected, respectively. The spacers are specifically designed to bend and flex to permit the device 30 to move within the curvilinear interior of the wheel without compressing or otherwise shortening the length of the device by more than about 6 inches due to the flexion of the overall shape.

The spacers can be constructed from any number of different materials such as metal wire, plastic rods or other such components and may have a neutral buoyancy, a positive buoyancy, or a negative buoyancy. Of course, any number of other components capable of engaging and spacing each of the plurality of floats equidistantly from the weight and/or each other are also contemplated.

In one nonlimiting embodiment, the central weight 31 of the device 30 can include a weight 30 pounds, and each of the first plurality of floats 32*a* and the second plurality of floats 32*b* can include a buoyant factor of 60 pounds each. As such, if there are fifteen individual floats 32 within each of the first and second plurality of floats 32*a* and 32*b*, then each float 32 will have an independent buoyant factor of 4 pounds each.

When used with the exemplary wheel 20 described above, the weighted flotation device 30 would include an overall length of 80 feet, and a maximum outside diameter/dimension of 4 inches so as to move within the individual tube elements 21-29 of the wheel 20. Of course, other dimensions are contemplated for use with the same wheel or another wheel having different dimensions.

Figure 4:
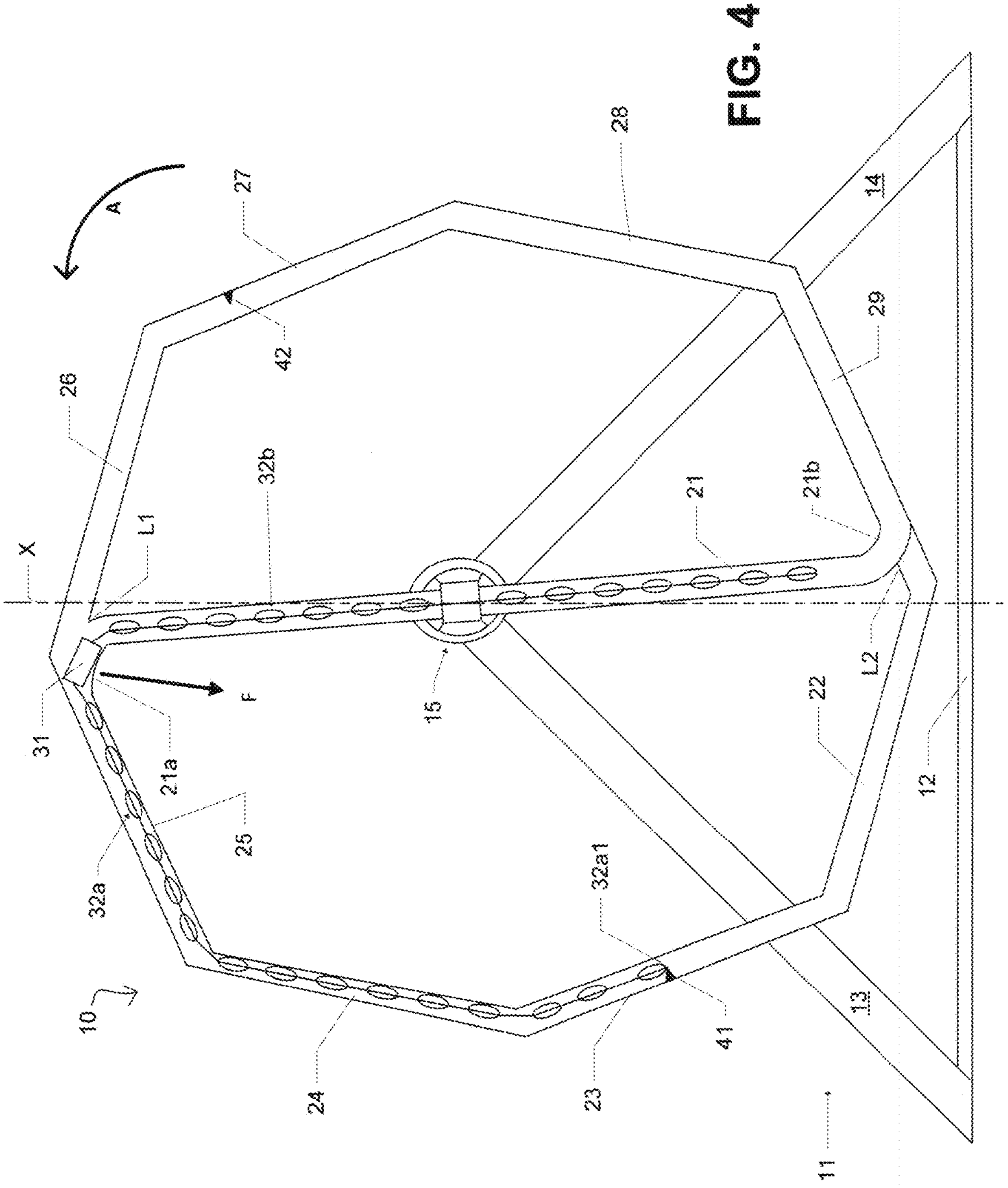
FIG. 4 is a perspective view of the rotating liquid filled wheel system in operation, in accordance with one embodiment of the invention.
Figure 5:
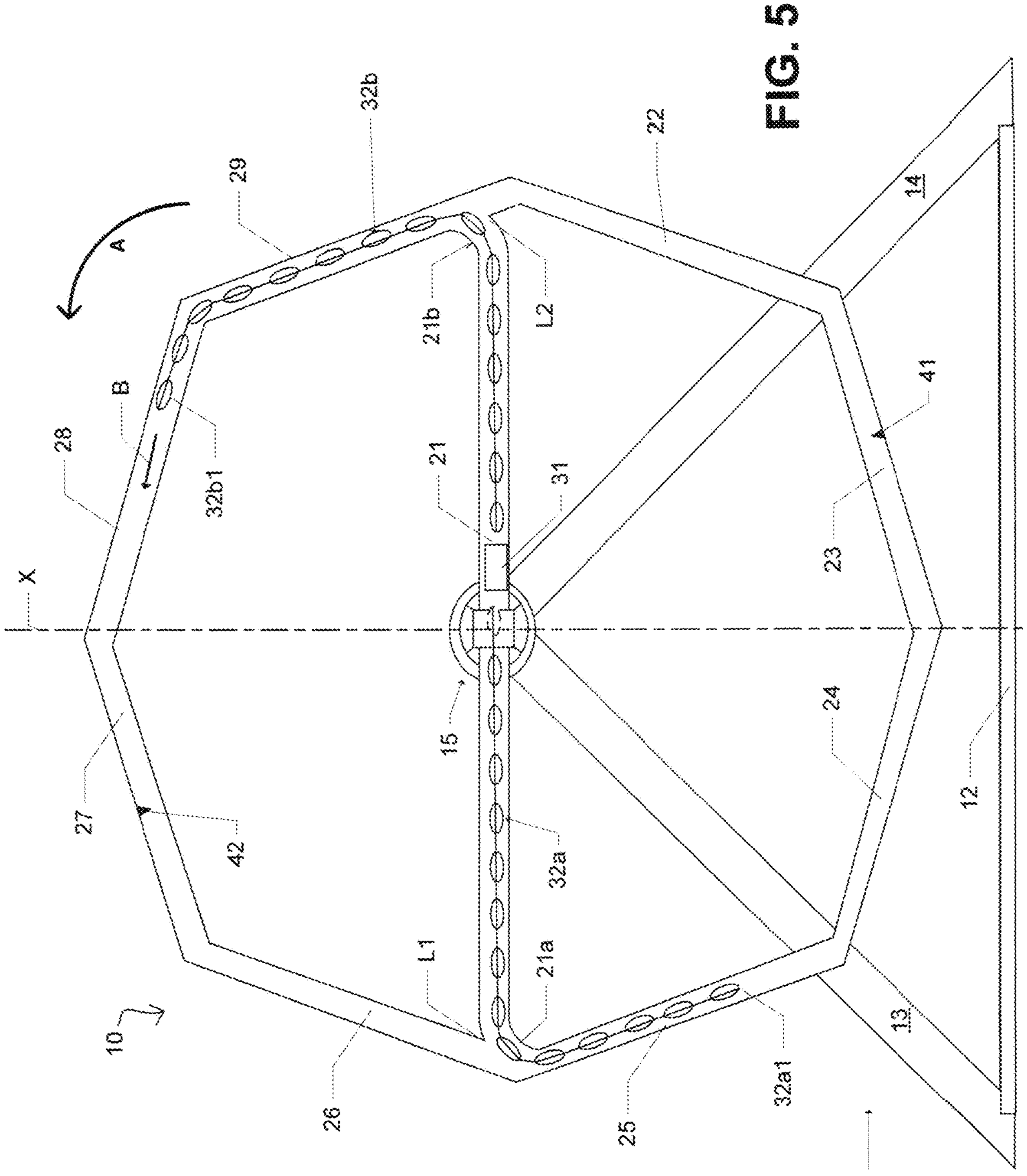
FIG. 5 is another perspective view of the rotating liquid filled wheel system in operation, in accordance with one embodiment of the invention.
Figure 6:
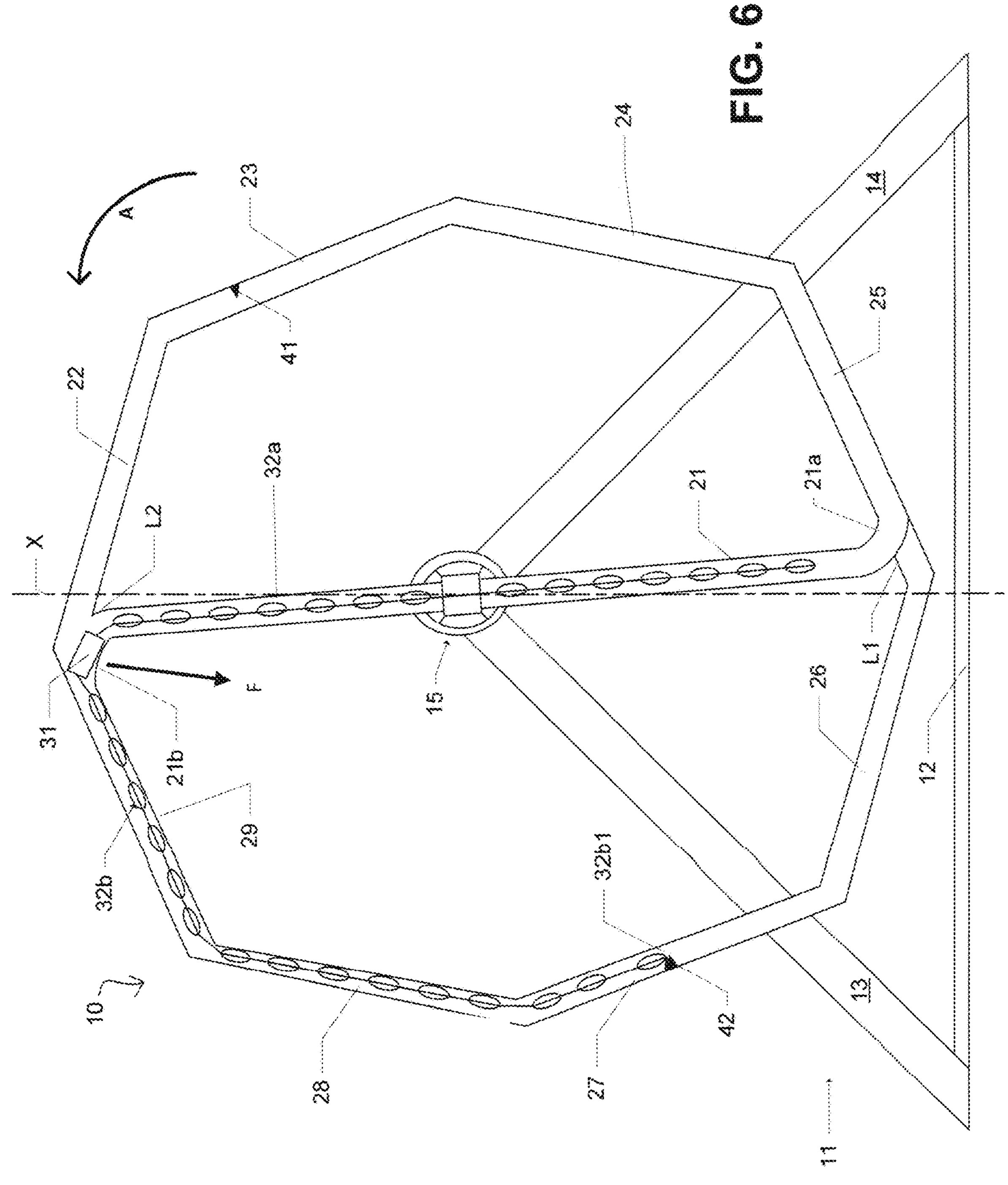
FIG. 6 is yet another perspective view of the rotating liquid filled wheel system in operation, in accordance with one embodiment of the invention.

FIGS. 4-6 illustrate one embodiment of the system 10 in operation wherein the flotation device 30 is located within the hollow interior space of the wheel 20 and the same is filled with a fluid such as water.

To begin operation, an outside force (e.g., manual rotation or using a motor/drive system) can be imparted onto the wheel 20 in order to rotate the wheel in a first direction as shown by arrow a. During this time, the central tube 21 will transition from a horizontal orientation (FIG. 1) towards a vertical orientation as shown at FIG. 4, thus causing the first plurality of floats 32*a* and the second plurality of floats 32*b* to rapidly lift the weight 31 upward. The movement will continue until the distal end 32*al* of the first plurality of weights 32*a* engages a small stopper/protrusion 41 within the wheel. The protrusion is positioned specifically so as to ensure the weight 31 is located within the first bend 21*a* adjacent to the first lip L1 when encountering the distal end 32*al*.

When so located, the orientation of the weight 31 will be offset from the center axis X of the wheel. This positioning causes the weight 31 to impart a downward force F onto a portion of the wheel in the direction of rotation which assists the wheel in continuing to spin in the first direction A.

As shown by FIGS. 5 and 6, the wheel 20 will continue to spin in the first direction A causing the center tube 21 to rotate 180 degrees. As the wheel rotates, the plurality of floats 32*a* and 32*b* will lift the weight 31 upward (arrow B) as the center tube passes through the horizontal position (FIG. 5). The movement will continue until the distal end 32*b*1 of the second plurality of weights 32*b* engages a second stopper/protrusion 42 and the weight 31 is positioned within the second bend 21*b* adjacent to the second lip L2. When so located, the weight 31 will again be offset from the center axis X of the wheel, and will impart a downward force F onto this end of the wheel in the first direction that assists the wheel in continuing to spin in the first direction A. This rotation can continue until acted upon by an outside force.

Accordingly, the above described system can function to greatly reduce the force required to continue the spinning motion of the wheel 20 after the initial force required to overcome the drag and resistance of the rotational assembly 15 has been applied to begin the rotation in the first direction.

As an aside, the system does not violate any laws of physics and specifically utilizes the laws of mass attraction, the law of weight and balance, the law of displacement and Newtons First law of Motion. As noted above, the preferred shape of the wheel is in the form of a polygon, and each side is at a reduced angle compared to the route of the weight which is a straight vertical. Thus, the law of displacement supports the floats to raise the weight within the neutral narrow balance zone. The weight never leaves the positive side of the wheel except after the power downward travels at the bottom center where gravity slows and then stops the movement and returns it to dead bottom where the law of displacement begins again. When the floats are in the negative side of the wheel, the bulk of the liquid is forced onto the positive side which counterbalances them.

As to a further description of the manner and use of the present invention, the same should be apparent from the above description. Accordingly, no further discussion relating to the manner of usage and operation will be provided.

As described herein, one or more elements of the above noted device and system can be secured together utilizing any number of known attachment means such as, for example, screws, glue, compression fittings, and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:

a base platform having a bottom end and a top end;

a wheel that is rotatably connected to upper end of the base platform; and a weighted flotation device that is positioned within the wheel, said flotation device including a central weight, and a plurality of floats that are configured to move as the wheel rotates, wherein the wheel includes a central tube and a plurality of radial tubes that are connected together to form a continuous internal pathway that is configured to be filled with a liquid.

2. The system of claim 1, wherein the radial tubes form a polygon shape.

3. The system of claim 1, wherein the continuous internal pathway includes a watertight construction.

4. The system of claim 1, wherein the weighted flotation device includes a buoyant construction.

5. The system of claim 4, wherein the weighted flotation device is configured to move in an upward direction within the central tube when the central tube is in a non-horizontal orientation.

6. The system of claim 5, wherein the movement of the weighted flotation device is caused by the buoyant construction of the weighted flotation device.

7. The system of claim 6, wherein the central weight is configured to be positioned in an offset orientation to a central axis of the wheel and to assist the rotation of the wheel.

8. A system, comprising:

a base platform having a bottom end and a top end;

a wheel that is rotatably connected to upper end of the base platform; and a weighted flotation device that is positioned within the wheel, said flotation device being configured to move as the wheel rotates, wherein the wheel includes a central tube and a plurality of radial tubes that are connected together to form a continuous internal pathway, and wherein the radial tubes form a polygon shape.

9. The system of claim 8, wherein the continuous internal pathway includes a watertight construction.

10. The system of claim 9, wherein the continuous internal pathway is filled with a liquid.

11. The system of claim 10 wherein the weighted flotation device includes a central weight, and a plurality of floats.

12. The system of claim 11 wherein the weighted flotation device includes a buoyant construction.

13. The system of claim 12 wherein the weighted flotation device is configured to move in an upward direction within the central tube when the central tube is in a non-horizontal orientation.

14. The system of claim 13, wherein the movement of the weighted flotation device is caused by the buoyant construction of the weighted flotation device.

15. The system of claim 14, wherein the central weight is configured to be positioned in an offset orientation to a central axis of the wheel and to assist the rotation of the wheel.

* * * * *